(12) United States Patent
Lipton et al.

(10) Patent No.: US 9,079,337 B2
(45) Date of Patent: Jul. 14, 2015

(54) SYSTEMS AND METHODS FOR FREEFORM FABRICATION OF FOAMED STRUCTURES

(75) Inventors: Jeffrey I. Lipton, Hamden, CT (US);
Hod Lipson, Ithaca, NY (US)

(73) Assignee: Cornell University, Ithaca, NY (US)

( * ) Notice: Subject to any disclaimer, the term of this patent is extended or adjusted under 35 U.S.C. 154(b) by 90 days.

(21) Appl. No.: 13/356,194

(22) Filed: Jan. 23, 2012

(65) Prior Publication Data
US 2012/0241993 A1  Sep. 27, 2012

Related U.S. Application Data

(60) Provisional application No. 61/435,735, filed on Jan. 24, 2011, provisional application No. 61/435,732, filed on Jan. 24, 2011.

(51) Int. Cl.
| | |
|---|---|
| B29C 41/22 | (2006.01) |
| B29C 37/00 | (2006.01) |
| A47J 43/25 | (2006.01) |
| A23P 1/08 | (2006.01) |
| B29C 67/00 | (2006.01) |
| A47J 43/04 | (2006.01) |

(52) U.S. Cl.
CPC ............. *B29C 37/0025* (2013.01); *A23P 1/086* (2013.01); *A47J 43/04* (2013.01); *A47J 43/25* (2013.01); *B29C 67/0055* (2013.01); *A23P 2001/089* (2013.01)

(58) Field of Classification Search
CPC  B29C 67/0055; B29C 67/0081; B29C 41/36; B29C 67/0051; B29C 47/0002; B29C 47/0064; A23G 1/20; A23G 1/205; A23P 1/10; A23P 1/105; A23P 1/112; A23P 1/12; A23P 2001/089; A47J 43/25
USPC ......................................................... 264/308
See application file for complete search history.

(56) References Cited

U.S. PATENT DOCUMENTS

| | | | | |
|---|---|---|---|---|
| 3,046,178 | A | * | 7/1962 | Tupper ........................... 156/167 |
| 3,314,840 | A | * | 4/1967 | Lloyd et al. ................... 156/167 |
| 4,119,583 | A | * | 10/1978 | Filip et al. ..................... 521/103 |
| 4,344,710 | A | * | 8/1982 | Johnson et al. .............. 366/76.2 |
| 5,121,329 | A | | 6/1992 | Crump |
| 5,303,141 | A | * | 4/1994 | Batchelder et al. ............. 700/29 |
| 5,653,925 | A | * | 8/1997 | Batchelder .................... 264/113 |
| 5,738,817 | A | * | 4/1998 | Danforth et al. .............. 700/119 |
| 6,280,784 | B1 | | 8/2001 | Yang et al. |
| 6,280,785 | B1 | | 8/2001 | Yang et al. |
| 6,372,178 | B1 | | 4/2002 | Tseng |
| 7,625,198 | B2 | | 12/2009 | Lipson et al. |

(Continued)

OTHER PUBLICATIONS

Zein, I. et al., Fused deposition modeling of novel scaffold architectures for tissue engineering applications, Biomaterials, vol. 23 (2002), pp. 1169-1185.*

(Continued)

*Primary Examiner* — Matthew Daniels
(74) *Attorney, Agent, or Firm* — Burns & Levinson LLP; Jacob N. Erlich; Orlando Lopez

(57) ABSTRACT

Technologies are provided herein for fabricating foamed structures using a three dimensional fabricator. In particular, the present disclosure provides systems and methods of producing foamed structures using foamed materials, lattice foamed materials, and/or layer deposition employing the concept of viscous thread instability.

2 Claims, 6 Drawing Sheets

(56) References Cited

U.S. PATENT DOCUMENTS

| | | | |
|---|---|---|---|
| 7,725,209 | B2 | 5/2010 | Menchik et al. |
| 2003/0207638 | A1* | 11/2003 | Bowlin et al. ............... 442/329 |
| 2004/0037813 | A1* | 2/2004 | Simpson et al. ............ 424/93.7 |
| 2006/0156978 | A1 | 7/2006 | Lipson et al. |

OTHER PUBLICATIONS

Ribe, N.M., et al., Multiple coexisting states of liquid rope coiling, J. Fluid Mech., vol. 555 (2006), pp. 275-297.*

Periard, D., et al., Printing Food, SFF Proceedings (2007), pp. 564-574.*

Hutmacher, D.W., et al., Scaffold-based tissue engineering: rationale for computer-aided design and solid free-form fabrication systems, Trends in Biotechnology, vol. 22, No. 7 (Jul. 2004), pp. 354-362.*

Morris et al., The Meandering Instability of a Viscous Thread, Physical Review E, vol. 77 (2008), pp. 066218-1 to 066218-11.*

Crockett, R., et al., Fused deposition modeling in microgravity, Proceedings of the 1999 Solid Freeform Fabrication Symposium (1999), pp. 671-678.*

Chen, Z., et al., Fabrication of osteo-structure analogous scaffolds via fused deposition modeling, Scripta Materialia, vol. 52 (2005), pp. 157-161.*

Too, M.H., et al., Investigation of 3D Non-Random Porous Structures by Fused Deposition Modelling, Int. J. Adv. Manuf. Technol., vol. 19 (2002), pp. 217-223.*

Kalita, S.J., et al., Development of controlled porosity polymer-ceramic composite scaffolds via fused deposition modeling, Materials Science and Engineering C, vol. 23, No1. 5 (2003), pp. 611-620.*

International Search Report dated Aug. 31, 2012 for PCT/US12/22210.

International Search Report dated Aug. 24, 2012 for PCT/US12/22213.

Lipton, J. I. et al. (2010) "Multi-material Food Printing with Complex Internal Structure Suitable for Conventional Post-Processing," 21st Solid Freeform Fabrication Symposium.

Cohen, D.L. eet al. (2009) "Hydrocolloid Printing: A Novel Platform for Customized Food Production," Solid Freeform Fabrication Symposium.

Lipton, J. et al. (2010) "Freeform Fabrication of Stochastic and Ordered Cellular Structures," 21st Solid Freeform Fabrication Symposium.

Murph, D. The Cornucopia: MIT's 3D food printer patiently awaits 'the future.' Posted Jan. 21, 2010. Available at: http://www.engadget.com/2010/01/21/the-cornucopia-mits-3d-food-printer-patiently-awaits-the-futu/.

Cornucopia: Prototypes and Concept Designs for a Digital Gastronomy. © 2003-2011 Marcelo Coelho. Available at: http://web.media.mit.edu/~marcelo/cornucopia/.

Williams, C. B. et al. (2005) "Towards the Design of a Layer Based Additive Manufacturing Process for the Realization of Metal Parts of Designed Mesostructures," 16th Solid Freeform Fabrication Symposium, 217-230.

Williams, C. B. et al. Design and development of a layer-based additive manufacturing process for the realization of metal parts of designed mesostructure, Thesis, Jan. 15, 2008, Georgia Institute of Technology. Available at: http://smartech.gatech.edu/handle/1853/22687.

* cited by examiner

SYSTEMS AND METHODS FOR FREEFORM FABRICATION OF FOAMED STRUCTURES

CROSS-REFERENCE TO RELATED APPLICATIONS

This application claims priority to co-pending U.S. Provisional Application Ser. No. 61/435,735, filed Jan. 24, 2011 and entitled DEPOSITION OF MATERIALS FOR SOLID FREEFORM FABRICATION, and to co-pending U.S. Provisional Application Ser. No. 61/435,732, filed Jan. 24, 2011 and entitled DEPOSITION TOOL WITH INTERCHANGEABLE MATERIAL BAY, wherein the contents of both applications are incorporated by reference herein in their entirety and for all purposes.

BACKGROUND

Cellular materials are ubiquitous in the modern world. Often they are used because of their low weight and outstanding insulating properties. They have been used as thermal, acoustic, and mechanical isolators. Varying the pore size and material density allows for the manipulation of stiffness, strength and other material properties. Cellular materials fall into two major categories: stochastic, and ordered. Stochastic cellular materials include foams, sponges, and non-woven textiles. These produce an assortment of closed or open cells which do not follow any regular deterministic pattern. Non-woven textiles in particular are used in such varied applications as carpets, filters, surgical gowns, and textured surfaces. Ordered cellular structures consist of geometric patterns such as truss structures, lattices, and honeycombs. Traditional subtractive methods of manufacturing are generally incapable of directly producing such ordered microstructures.

Accordingly, there is a need for methods and systems for producing open or closed cell foam structures.

BRIEF SUMMARY

Technologies are provided herein for fabricating foamed structures using a three dimensional fabricator. In particular, the present disclosure provides systems and methods of producing foamed structures using foamed materials, lattice foamed materials, and/or layer deposition employing the concept of viscous thread instability.

In one aspect, a method of fabricating a closed cell foam structure, includes introducing a gas in a material to generate a gas containing material having gas particles within the material and depositing the gas containing material on a surface such that a foam structure is fabricated.

In another aspect, a method of fabricating foam structures, includes depositing material on a surface such that gaps are introduced between walls of the material to form a three dimensional foam structure.

In yet another aspect, a three dimensional fabricator includes a control unit and a material deposition tool that receives instructions from the control unit and deposits material on a surface such that gaps are introduced between walls of the material to form a three dimensional foam structure based on the instructions received from the control unit.

DETAILED DESCRIPTION

Technologies are provided herein for fabricating foamed structures using a three dimensional fabricator. In particular, the present disclosure provides systems and methods of producing foam structures using foamed materials, lattice foamed materials, and/or layer deposition techniques employing the concept of viscous thread instability. Foam structures may include, but are not limited to, structures that contain gaps, voids, openings, indentations within the structure, or on an exterior surface of the structure. These foam structures may have different structural properties than non-foam structures, including but not limited to, properties related to density, weight, elasticity, strength, and stress.

The present disclosure will be more completely understood through the following description, which should be read in conjunction with the drawings. In this description, like numbers refer to similar elements within various embodiments of the present disclosure. Within this description, the claims will be explained with respect to embodiments. The skilled artisan will readily appreciate that the methods, apparatus and systems described herein are merely exemplary and that variations can be made without departing from the spirit and scope of the disclosure.

Co-pending international applications PCT/US12/22210 entitled "DEPOSITION OF MATERIALS FOR EDIBLE SOLID FREEFORM FABRICATION" and PCT/US12/22213 entitled "DEPOSITION TOOL WITH INTERCHANGEABLE MATERIAL BAY", both filed on Jan. 23, 2012, having first named inventor Jeffrey Lipton, are hereby incorporated by reference in their entirety and for all purposes. In addition, issued U.S. Pat. No. 7,625,198 entitled "MODULAR FABRICATION SYSTEMS AND METHODS" is also hereby incorporated by reference in its entirety and for all purposes.

Figure 1:
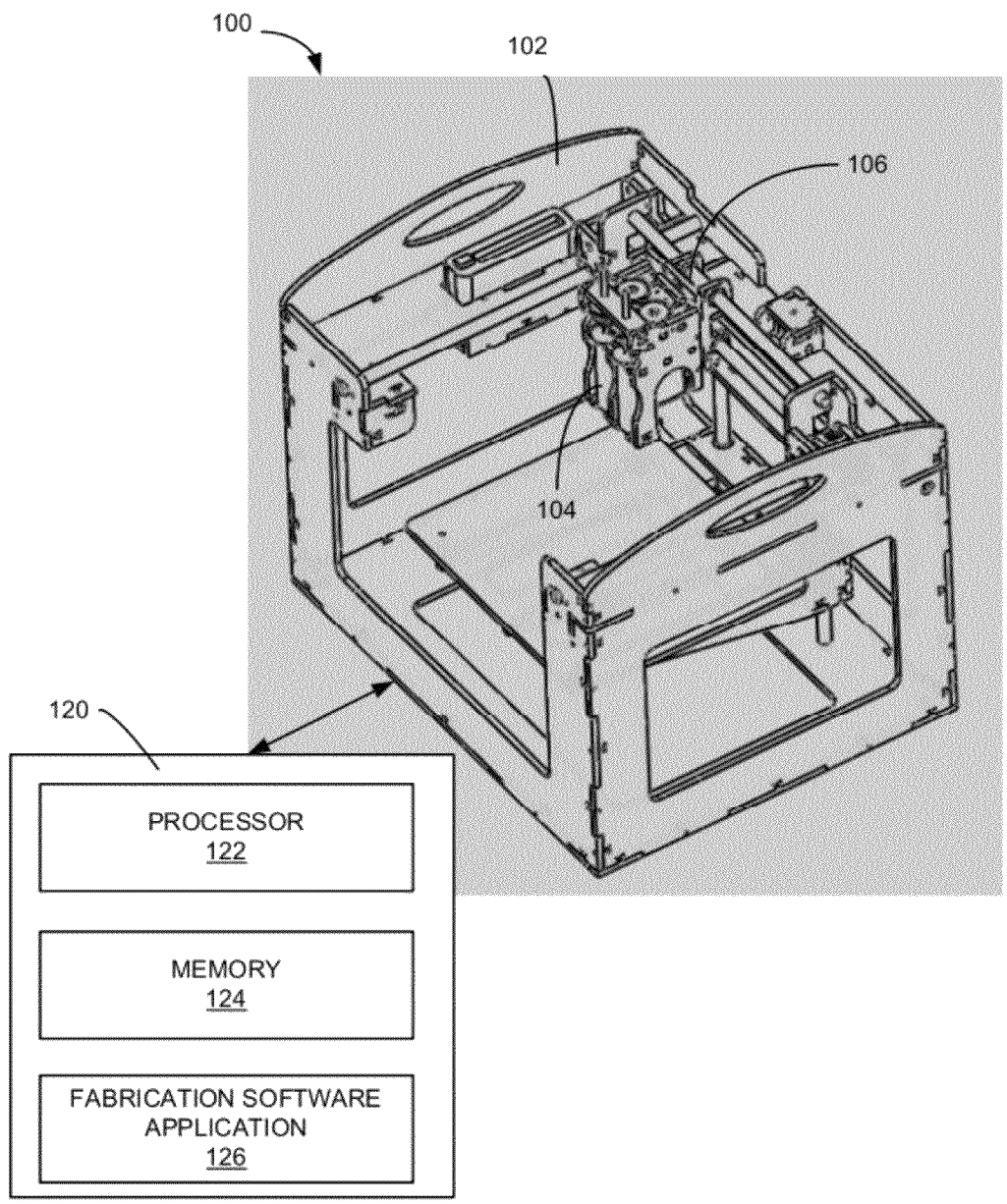
FIG. 1 is a perspective view of a three dimensional fabricator according to embodiments of the present disclosure.

Referring now to the figures, FIG. 1 is a perspective view of a three dimensional fabricating system according to embodiments of the present disclosure. The fabrication system 100 includes a fabricator 102 including a material deposition tool 104, a control unit 106 having one or more actuators and sensors configured to control operating characteristics of the material deposition tool 104, and a fabrication command unit 120 coupled to the fabricator 102. The fabrication command unit 120 includes a processor 122, a memory 124, and a fabrication software application 126 stored on the memory 124 that is executed by the processor 122. It should be appreciated that the control unit 106 of the fabricator 102 may be configured to receive instructions from the fabrication command unit such that the fabricator 102 can fabricate open or closed cell foam structures from materials dispensed from the material deposition tool 104.

According to embodiments, the fabricator 102 may be a Model 2 Fab @Home Digital Fabricator with a syringe based deposition tool. Other types of material deposition tools may be utilized, including but not limited to, a syringe based-mechanical displacement tool, a plastic deposition tool, a material pressure driven tool, a pipetting tool. In some embodiments, a syringe based deposition tool is used due to its ability to deposit a wide variety of materials, including elastic build materials and support materials. The fabrication software application 126 may constitute include FabStudio version 1 beta for generating the tool path information.

SFF technology may directly fabricate predesigned ordered cellular structures. However, complex cellular features and structures require the pores to be orders of magnitude larger than the process resolution and complex CAD programs are required to generate the intended geometry. However, existing processes are unable to generate closed cellular structures of arbitrary geometry. Instead, the processes used to create the lattice structures require a fugitive support material, or relied on the regularity of the shape.

The fabrication software application 126 used to generate material deposition tool paths for fused deposition method (FDM) machines can delineate how a single material can be used to generate shapes with entrapped air. The fabrication software application 126 overcomes traditional geometric limitations by using a process of generating sub layers of identical boundaries which contain the cellular structure, while allowing for the overall shape to vary, as will become apparent with respect to FIGS. 2-5.

According to various embodiments of the present disclosure, three dimensional open or closed cell foam structures can be fabricated using a variety of techniques. A first technique focuses on the creation of materials which would contain air or gas when extruded. Such materials, when deposited, could turn any geometry directly into a foamed structure. In order to entrap the gas, a liquid material, including but not limited to, liquid silicone, may be mixed with a gas to introduce gas particles in the material. As a result, gas particles may be impregnated within the combined material containing the liquid material and the gas. In various embodiments, the liquid material may be carbonated. This may be done by connecting two pressure vessels by a channel. In one vessel, reactants of acetic acid and sodium bicarbonate may be placed and allowed to react, producing carbon dioxide. In the other vessel, a large quantity of silicone is placed. Pressure is allowed to equalize between the chambers until the reactions in the reaction chamber are completed, upon which the pressure may be released and the silicone is allowed to dry in bulk.

Other methods of creating the foamed material may involve chemical reactions with the material. Sodium bicarbonate powder is rapidly mixed into liquid silicone and a solution of acetic acid and water is then mixed into the combined silicone/bicarbonate. The solution may then be mixed vigorously until the reaction is complete. Uncured foam silicone may be extruded through a standard EFD syringe at 80 psi during the Solid Freeform Fabrication process. The silicone may then be allowed to cure in bulk producing a foamed structure.

A second technique focuses on the use of a custom pathing algorithm that can generate geometric distributions of gas, such as air. The custom pathing algorithm may be a part of the fabrication software application 126 described above with respect to FIG. 1. The custom pathing algorithm may be based on an alternating regular rectangular lattice structure and may decompose an arbitrary geometric image into 3 regions: the bottom seal layers, the top seal layers, and the interior layers. In some embodiments, the top and bottom regions may be pathed using a conventional solid fill pather. However, the interior region may use a custom pather which can produce at least one concentric boundary paths to form a wall which sealed the layers that form the exterior paths and interior paths that left only one quarter of the space filled. Multiple walls ensure that a single error in the print process would not connect the interior air to the atmosphere. In this way, the interior air is sealed from the atmosphere preventing any leakages. In various embodiments, Dow Corning RTV Sealant 732, which a clear silicone can be used as the build material since it prints reliably.

This process relies on assumptions that can be made about the rectangular geometry of the prisms. The prism is 2.5-D; each layer had the same geometry as the previous layers. This ensures that the exterior solid boundaries are continuous and unbroken and the sparse filled region remains contained. In order to apply this method to a 3D geometry, the geometry may need to vary slowly so that the outer boundary changes by no more than one path width inwards or outwards from layer to layer. A path width is the width of the material as it is being dispensed from the material dispensing tool of the fabricator.

This method can be applied to an arbitrary geometry. If the geometry is sliced by three or more multiples of the material's native path height, which is the height of the material as it is being dispensed, it is possible to apply the sealed sparse planning algorithm to the slice. The top and bottom sub-layers are solid filled, and the intermediate sub-layers are sparse filled as shown in FIGS. 2A-2B, and 3A-3D.

In embodiments where the foam structure need not be sealed, the top and bottom layers may also be pathed using the custom pather. In this way, the top and bottom surfaces may also include gaps, resulting in a textured surface. In other embodiments, only the top and bottom surfaces may be pathed using the custom pather, while the interior layers are solid filled. In this way, the surfaces may be textured but the structure may include a solid filled core.

Figure 2A:
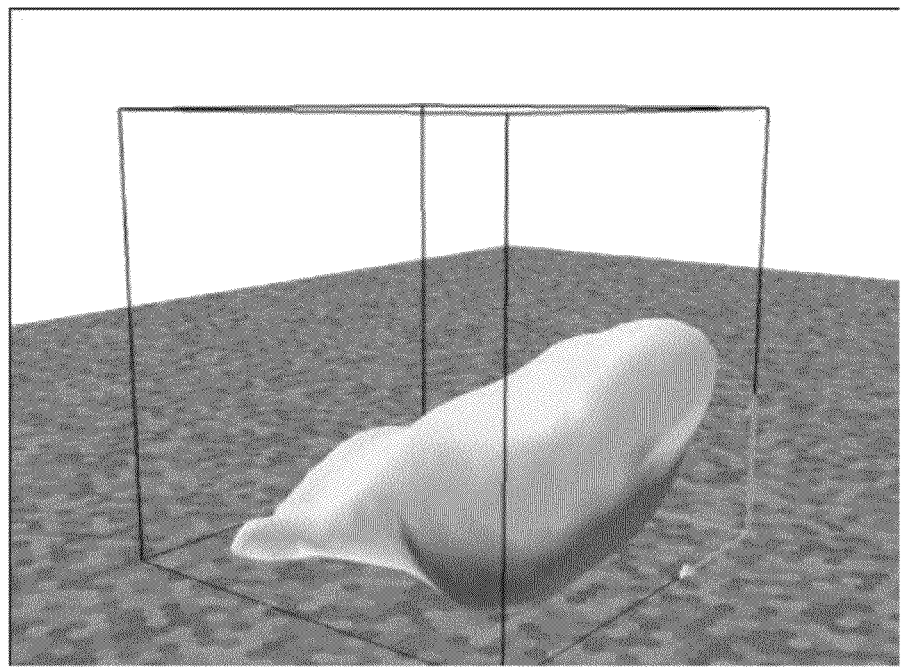
FIG. 2A illustrates an arbitrary geometry that can be sliced into sections which are integer multiples of the build materials native path height according to embodiments of the present disclosure.
Figure 2B:
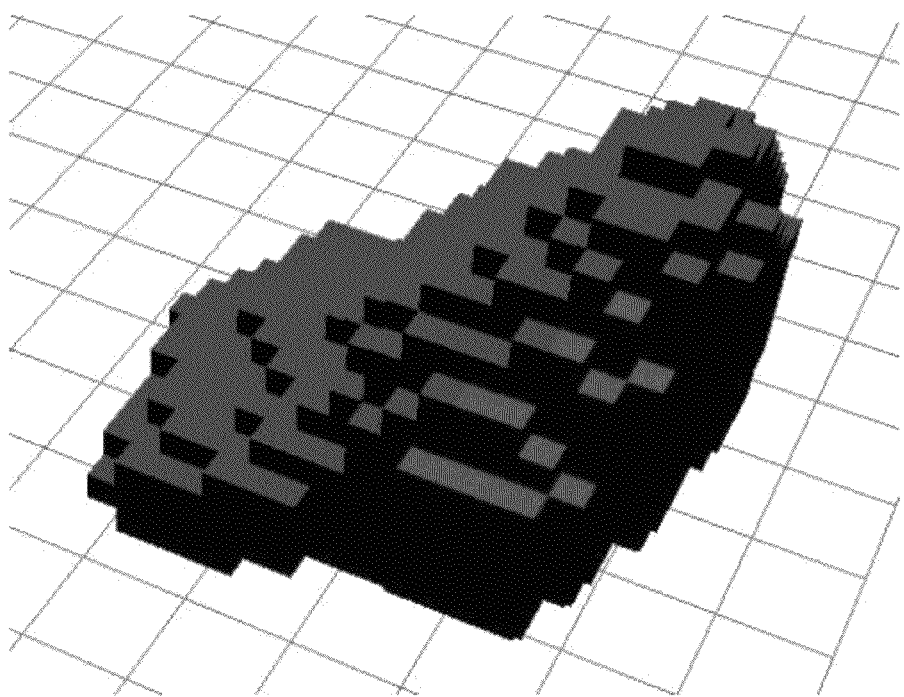
FIG. 2B illustrates an arbitrary geometry illustrated as a series of sections which are integer multiples of the build materials native path height according to embodiments of the present disclosure.
Figure 3A:
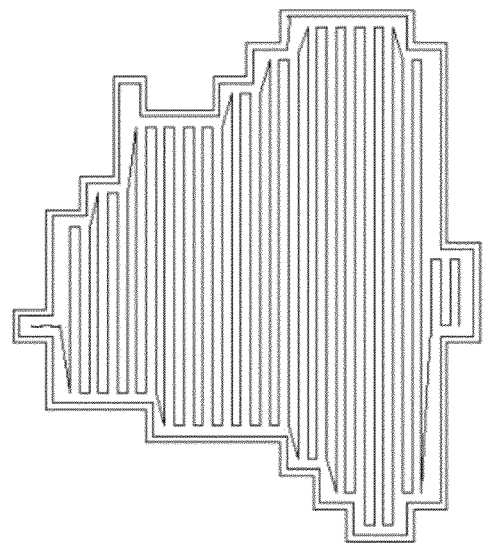
FIGS. 3A-D illustrate a series of slices of the geometry which are pathed using either a sparse fill (3B, 3C) or solid fill (3A, 3D) according to embodiments of the present disclosure.
Figure 3B:
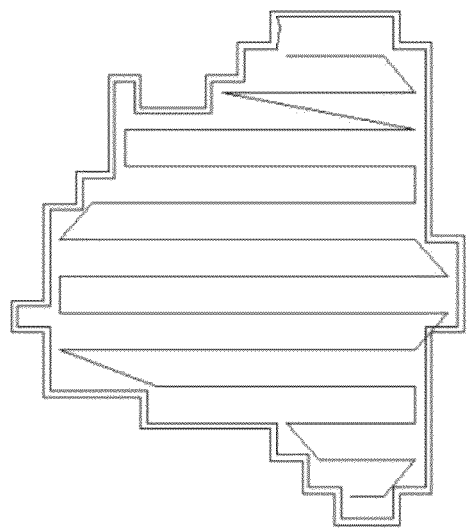
Figure 3C:
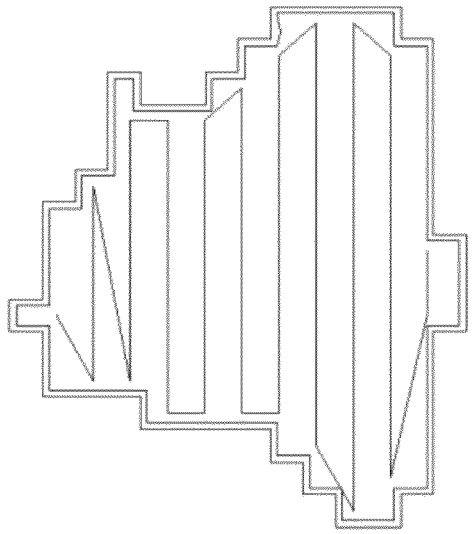
Figure 3D:
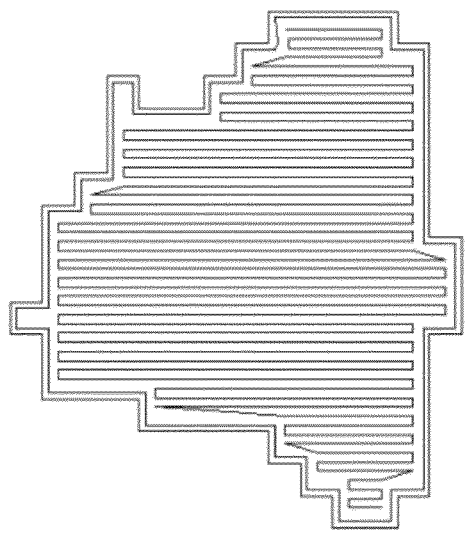

FIG. 2A and FIG. 2B are screenshots of a user interface associated with the fabrication software application 126. FIG. 2A illustrates an arbitrary geometry, while FIG. 2B illustrates a layered version of the arbitrary geometry shown in FIG. 2A. the fabrication software application is capable of analyzing an image of an object having an arbitrary geometry, and processing the image to generate an image of the object having distinct layers. By splitting the arbitrary geometry into a series of layers, the fabrication software application can send instructions to the fabricator causing the material deposition tool to generate layers corresponding to the layers shown in FIG. 2B.

Referring now to FIGS. 3A-D, a single slice of the arbitrary geometry is further divided into sub slices which are then pathed using either a sparse fill (3B, 3C) or solid fill (3A, 3D) are shown according to embodiments of the present disclosure. The solid fill sub slices 3A, 3D, may sandwich the sparsely filled sub slices 3B, 3C. In the event that the fabricated structure is not properly sealed, the fabricated structure can be coated in a thin layer of material and then allowed to dry. The process can be repeated until sealed.

A third technique focuses on the phenomenon of viscous thread instability to form a stochastic cellular structure. The instability of viscous threads is familiar to anyone who has drizzled honey. The threads buckle near the surface causing a coiling effect, which is known as the liquid rope coiling effect. As a result of the instability of viscous threads, various states or patterns, including but not limited to, figure eights, meandering, translated coiling, and double coiling, can be formed. The patterns are entirely predictable based on the nozzles width, relative speed, and height along with the material's density, viscosity, and surface tension. Inducing these states in a robocasting system can allow for the production of stochastic structures. The shapes and properties of the produced materials are deterministic based on the controlled parameters, but the microstructure produced is complex and appears random.

Figure 4:
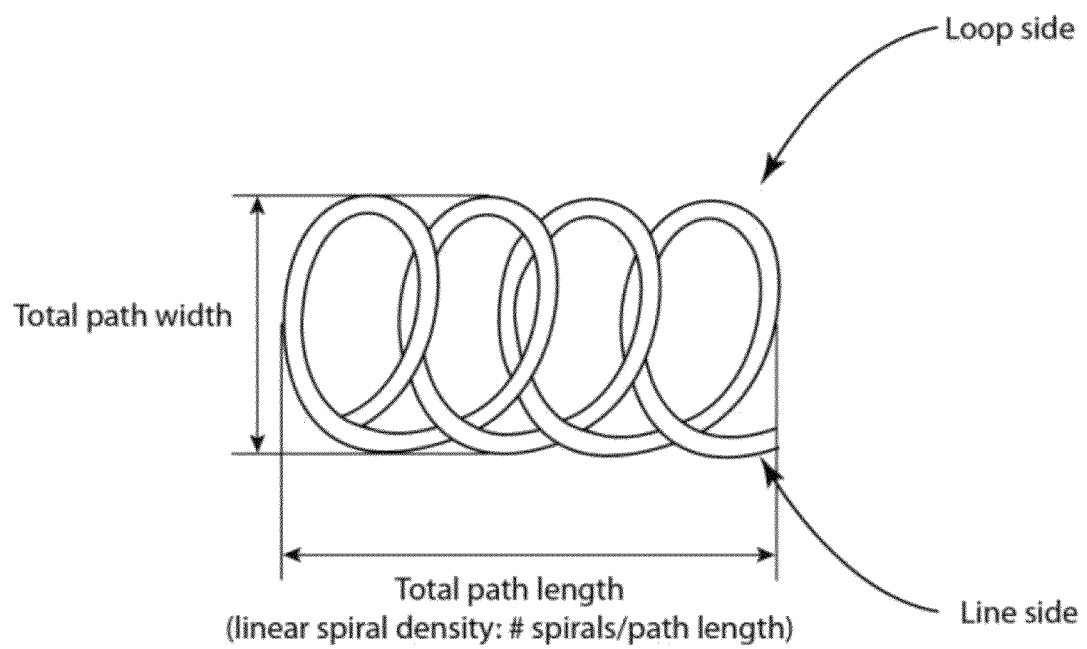
FIG. 4 illustrates a sample spiral and associated characteristics as the spiral is deposited to form the stochastic structure according to embodiments of the present disclosure.

Referring now to FIG. 4, FIG. 4 illustrates a sample spiral shaped piece of material and associated characteristics as the spiral shaped material is deposited to form the stochastic structure according to embodiments of the present disclosure. Instability of a viscous fluid flow can be induced by adjusting the flow and pathing characteristics. The values may be automatically or manually tuned until the silicone enters the translated coiling state. The flow rate of the material is increased beyond its rate for construction of solid objects while the material's deposition nozzle is elevated from the build platform beyond its normal solid construction height. This allows the materials to spiral after the stream from the deposition tool head hits the build target. The relative height of the nozzle from the build platform and the flow rate control the radius of the spiral of material. Path speed relative to fluid flow determines the linear spiral density. The density of the paths controls the spiraled material stream's overlap between paths. By using these modified flow values, it is possible to create an object where each layer consists of the translated coiled material. An object made from the coiling strand becomes a complex foam as each successful layer is added.

Figure 5A:
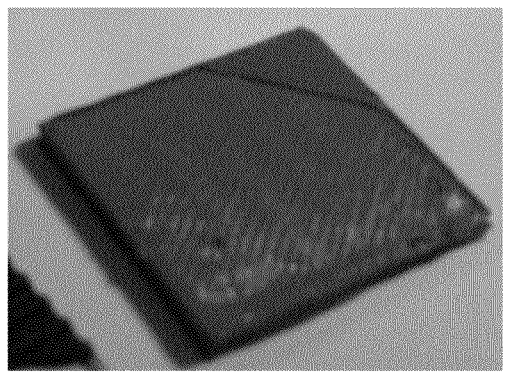
FIGS. 5A-5D illustrate images of a material which can be solid printed to create a stochastic foam by using viscous thread instability according to embodiments of the present disclosure.
Figure 5B:
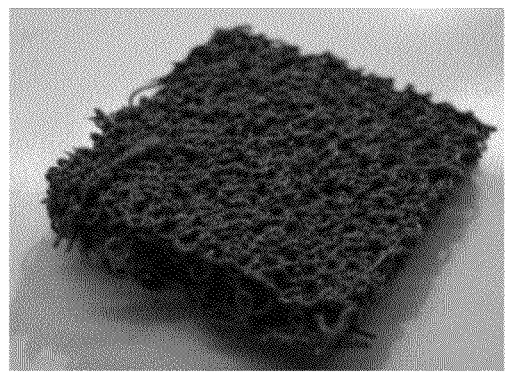
Figure 5C:
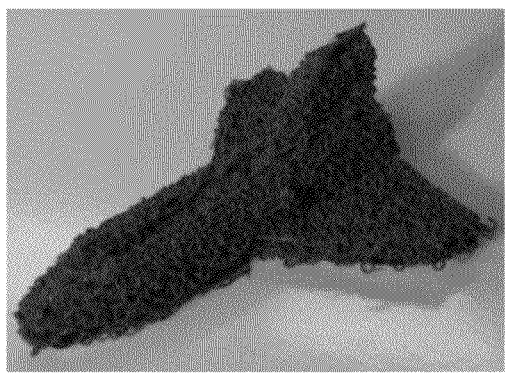
Figure 5D:
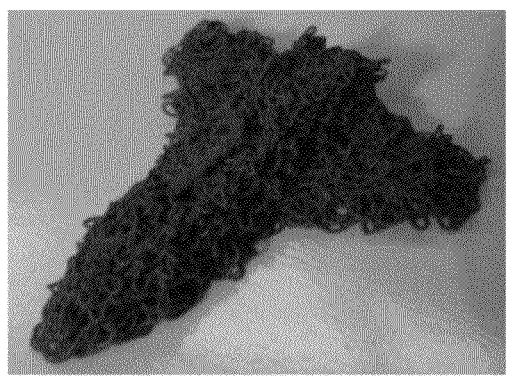

Translated coiling of the viscous thread produces open celled foams. Changes in the spiral width of the translated coils produced foams of different pore sizes and surface roughness. Referring now to FIGS. 5A-5D, a material is printed to create a stochastic foam by using viscous thread instability. In particular, FIGS. 5C and 5D illustrate respective images of a space shuttle printed using two different spiral widths. The geometry was processed using the modified values of path width and height of the translated coils. As can be seen in FIGS. 5C and 5D, the sizes of the pores are of the same order as the resolution of the printing process.

The techniques described herein allow for the fabrication of various cellular structures. A single material can be used to generate closed and open celled regular lattices. It can be used to produce stochastic open celled foams using viscous thread instability. Alternatively, it can be directly foamed to create closed cell stochastic foams. The pores are inherently of print process order and do not require any additional computation to translate a solid geometry into a stochastic foam of the desired shape. This demonstrates the ability to create a foamed object without the need for descriptions in CAD or complex geometric processing.

Such material distributions can be used to create bulk volumetric actuators. Volumetric actuators are a novel form of SFF actuators and may be the first isometrically expanding additively manufacturable actuators. While the direct deposition of a closed cell foamed elastic material may be a preferred means of creating an external pressure driven volumetric actuator, they may not be suitable for the creation of internally driven actuators. Additionally, the closed celled materials made from chemical reactions may not be as robust as the geometrically planned materials. The geometric processing methods can be used to create pneumatic actuators that are powered by internal pressure changes.

The ability to freeform fabricate foams of arbitrary shape but controlled pore size and void fraction could allow for novel applications of SFF. Catalytic converters, filters, and any other application of either non-woven threads or foams could benefit from the novel abilities of SFF. Additionally it is possible to use a single material to create gradations in mechanical properties by varying the print parameters used. Textures could be applied to additively manufactured parts without the need to have the texture features be orders of magnitude larger than the process resolution.

Figure 6:
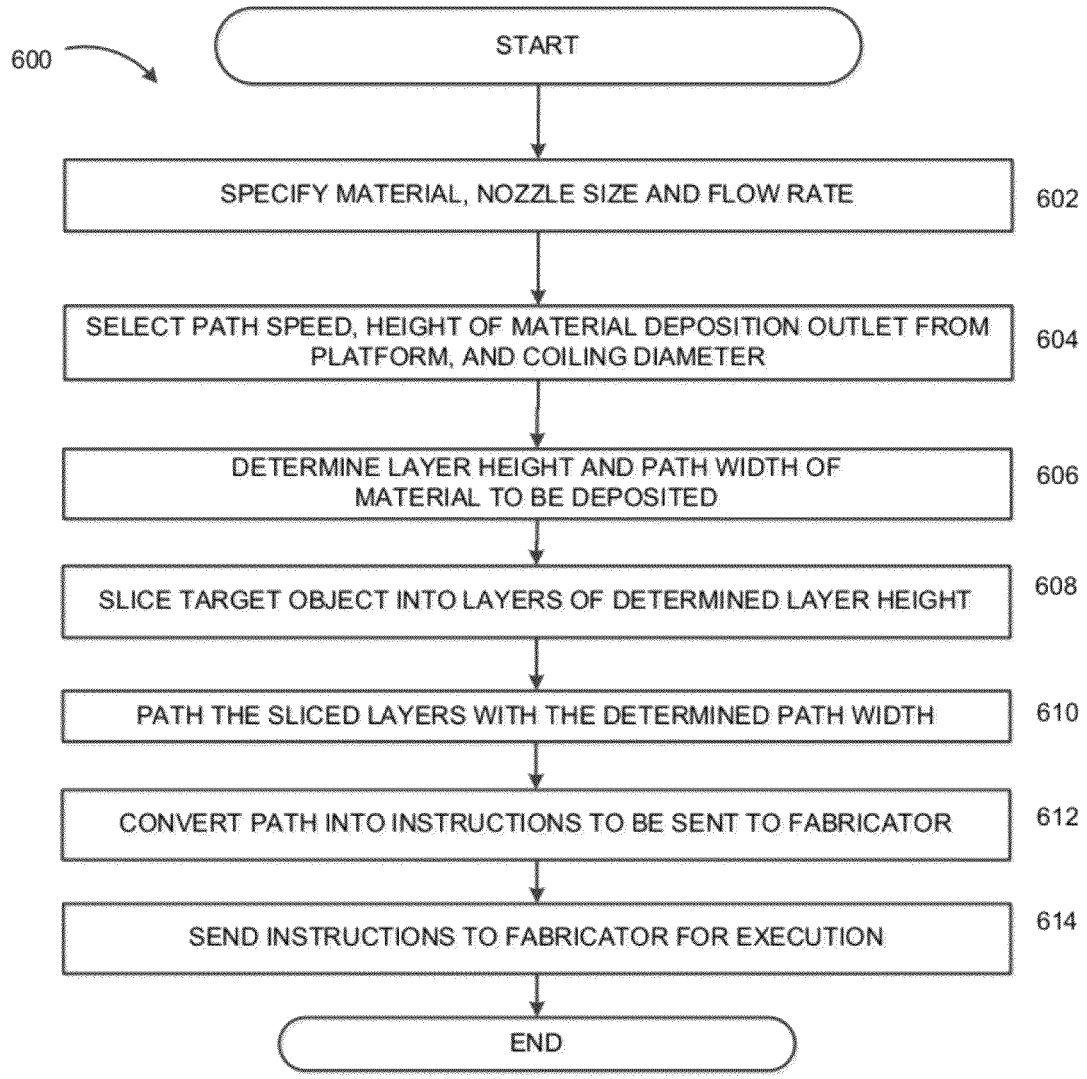
FIG. 6 is a flowchart representation of a method of fabricating a stochastic structure according to embodiments of the present disclosure.

FIG. 6 is a flowchart representing a process for fabricating stochastic cellular structures. A routine 600 begins at operation 602, where the fabrication software application 126 specifies the material to be used, the nozzle size, and the flow rate of the material. In some embodiments, a user may manually specify at least one of the material, nozzle size, and flow rate of the material for the fabrication software application 126. From operation 602, the routine 600 proceeds to operation 604, where the fabrication software application 126 selects a path speed, height of the material deposition outlet from the platform, and a coiling diameter. In some embodiments, a user may select at least one of the path speed, height of the material deposition outlet from the platform, and the coiling diameter. From operation 604, the routine 600 proceeds to operation 606, where the fabrication software application 126 determines the layer height and path width of material to be deposited, the nozzle size and the amount of overlap between coiled loop paths selected. Again, similar to operations 602 and 604, a user may provide this information to the fabrication software application 126.

From operation 606, the routine 600 proceeds to operation 608, where the fabrication software application 126 slices the target object into layers of the determined layer height. For a given material, these values may be saved as the specified layer height, path speed, path width, flow rate, and height of the material deposition outlet from the platform to be used. In this way, these settings may be used again without the need to recalibrate or calculate.

From operation 608, the routine 600 proceeds to operation 610, where the fabrication software application 126 paths the sliced layers with the determined path width. From operation 610, the routine 600 proceeds to operation 612, where the fabrication software application 126 converts the planned path into instructions to be sent to fabricator 102 which will cause the drive assembly 108 to move at the appropriate path speed, while depositing material at the appropriate flow rate. From operation 612, the routine 600 proceeds to operation 614, where the fabrication software application 126 sends the instructions to the fabricator 100 for execution until the fabricated structure is printed. From operation 612, the routine 600 ends.

In some embodiments, the fabricator may be equipped with a feedback control system that can determine if the fabrication process is functioning correctly. The feedback control system can measure the state of the printed object, including the average thickness or height of the material layers and variations in the thickness or height of the material layers. If the layer thickness is incorrect, the feedback control system may send instructions back to the fabrication software application indicating the current average height, which the fabrication software application 126 then uses as the starting slice height of the fabricator 102. the fabrication software application 126 then generates a new set of slices starting from that height and paths the new set of slices, as described in operation 610.

If the feedback control system detects an error in the porosity of the material, the fabrication software application 126 is notified and the fabrication software application 126 returns to operation 604, where a new path speed, height of the material deposition outlet from the platform, and/or coiling diameter is selected to achieve intended results.

While the foregoing has described the best mode and, where appropriate, other modes of performing the disclosure, the disclosure should not be limited to specific apparatus configurations or method steps disclosed in this description of the preferred embodiment. Those skilled in the art will also recognize that the disclosure has a broad range of applications, and that the embodiments admit of a wide range of modifications without departing from the inventive concepts.

What is claimed is:

1. A method of fabricating a 3D foam structure comprising:
   receiving an image of the geometry of the foam structure to be fabricated;
   slicing the image into slices;
   further slicing said slices into sub slices;
   generating bottom seal layer sub slice and top seal layer sub slice material deposition tool paths each comprising an exterior wall and a solid fill path, and an interior layer sub slice material deposition tool path comprising an exterior wall and a sparsely filled sub slice with channels;
   depositing the bottom seal layer along the bottom seal layer sub slice material deposition tool path;
   depositing the interior layer along the interior layer sub slice material deposition tool path to form channels;
   depositing the top seal layer along the top seal layer sub slice material deposition tool path bridging said channels in the interior layer to entrap air in closed cell foam channels.

2. A method of fabricating multi-layer foam structures comprising:
   slicing a target object into layers of a predetermined height with a fabrication software application;
   pathing the sliced layers with the fabrication software application to form deposition paths;
   dispensing material from a nozzle on a surface along a first deposition path in a translated coiling pattern caused by viscous thread instability to form a first layer;
   dispensing material from the nozzle on the first layer along a second deposition path in a translated coiling pattern caused by viscous thread instability to form a second layer.

* * * * *